US011107145B2

(12) United States Patent
Li et al.

(10) Patent No.: US 11,107,145 B2
(45) Date of Patent: Aug. 31, 2021

(54) ORDER DETERMINATION METHOD, NON-TRANSITORY COMPUTER-READABLE MEDIUM AND SYSTEM IN AN UNMANNED STORE

(71) Applicant: Advanced New Technologies Co., Ltd., Grand Cayman (KY)

(72) Inventors: Jiajia Li, Hangzhou (CN); Lei Jiao, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 34 days.

(21) Appl. No.: 15/889,997

(22) Filed: Feb. 6, 2018

(65) Prior Publication Data
US 2018/0260877 A1  Sep. 13, 2018

(30) Foreign Application Priority Data
Mar. 7, 2017 (CN) .......................... 201710132342.2

(51) Int. Cl.
*G06Q 30/06* (2012.01)
*G06Q 20/32* (2012.01)
(Continued)

(52) U.S. Cl.
CPC ....... *G06Q 30/0633* (2013.01); *G06Q 20/203* (2013.01); *G06Q 20/208* (2013.01);
(Continued)

(58) Field of Classification Search
None
See application file for complete search history.

(56) References Cited

U.S. PATENT DOCUMENTS 6,032,127 A * 2/2000 Schkolnick .......... G06Q 20/203
705/22
7,397,373 B2  7/2008 Hunt
(Continued)

FOREIGN PATENT DOCUMENTS

CN  1831557  9/2006
CN  1845163  10/2006
(Continued)

OTHER PUBLICATIONS

Freedom shopping announces OEM offering for retail RFID checkout & security. (Mar. 13, 2008). Business Wire Retrieved from https://dialog.proquest.com/professional/docview/675908207?accountid=161862 (Year: 2008).*
(Continued)

*Primary Examiner* — Allison G Wood
*Assistant Examiner* — Ashley D Preston
(74) *Attorney, Agent, or Firm* — Fish & Richardson P.C.

(57) ABSTRACT

Order determination technologies for unmanned store are disclosed. In an implementation, registration information including a container identifier (ID) associated with a shopping container is received from a mobile device of a customer shopping at a store. A user account of the customer is associated with the container ID based on the registration information. A radio frequency (RF) signal from an RF tag attached to the shopping container is detected. A plurality of RF signals are received from a plurality of RF tags are attached to a plurality of corresponding items in the store. One or more items of the plurality of items are determined within a predetermined distance from the shopping container based on the RF signals. An order including the determined one or more items is generated, and the order is associated to the customer's user account to be paid by the customer.

14 Claims, 8 Drawing Sheets

(51) Int. Cl.
*H04B 5/00* (2006.01)
*G06Q 20/20* (2012.01)
*G07G 1/00* (2006.01)
*G06Q 20/10* (2012.01)
*H04W 4/80* (2018.01)

(52) U.S. Cl.
CPC ....... *G06Q 20/322* (2013.01); *G06Q 20/3276* (2013.01); *G06Q 20/3278* (2013.01); *G07G 1/0045* (2013.01); *H04B 5/0062* (2013.01); *G06Q 20/10* (2013.01); *H04W 4/80* (2018.02)

(56) References Cited

U.S. PATENT DOCUMENTS

| | | | |
|---|---|---|---|
| 2002/0170961 | A1 | 11/2002 | Dickson et al. |
| 2005/0177423 | A1* | 8/2005 | Swanson, Sr. ......... G06Q 30/00 705/14.1 |
| 2009/0198734 | A1* | 8/2009 | Tessier ..................... G01S 5/02 |
| 2012/0158545 | A1 | 6/2012 | Chen et al. |
| 2013/0320085 | A1 | 12/2013 | Chen et al. |
| 2014/0067617 | A1 | 3/2014 | Heine et al. |
| 2015/0006319 | A1* | 1/2015 | Thomas ............. G06Q 30/0633 705/26.8 |
| 2015/0039458 | A1 | 2/2015 | Reid |
| 2015/0046213 | A1* | 2/2015 | Doreswamy ....... G06Q 30/0201 705/7.29 |
| 2015/0302708 | A1 | 10/2015 | Hattori |
| 2017/0046767 | A1 | 2/2017 | Xiao et al. |
| 2018/0197218 | A1* | 7/2018 | Mallesan .......... G06K 9/00771 |

FOREIGN PATENT DOCUMENTS

| | | |
|---|---|---|
| CN | 101176127 | 5/2008 |
| CN | 101661560 | 3/2010 |
| CN | 103562977 | 2/2014 |
| CN | 103593729 | 2/2014 |
| CN | 103617581 | 3/2014 |
| CN | 103617582 | 3/2014 |
| CN | 203588313 | 5/2014 |
| CN | 204102165 | 1/2015 |
| CN | 104361693 | 2/2015 |
| CN | 104678358 | 6/2015 |
| CN | 105093229 | 11/2015 |
| CN | 105324714 | 2/2016 |
| CN | 101836217 | 6/2016 |
| CN | 105930886 | 9/2016 |
| CN | 105981426 | 9/2016 |
| CN | 106297083 | 1/2017 |
| CN | 106372889 | 2/2017 |
| CN | 205983559 | 2/2017 |
| JP | 08290774 | 11/1996 |
| JP | 2005148924 | 6/2005 |
| JP | 2009238043 | 10/2009 |
| JP | 2010537346 | 12/2010 |
| JP | 2015537281 | 12/2015 |
| KR | 20060043319 | 5/2006 |
| KR | 20120066263 | 6/2012 |
| KR | 20140022034 | 2/2014 |
| TW | I382939 | 1/2013 |
| TW | I496096 | 8/2015 |
| TW | I566196 | 1/2017 |

OTHER PUBLICATIONS

Second Written Opinion in International Application No. PCT/US2018/021326, dated Feb. 14, 2019, 7 pages.
International Search Report and Written Opinion issued by the International Searching Authority in International Application No. PCT/US2018/021326 dated May 30, 2018; 11 pages.
Komal Machhirke et al.; "A New Technology of Smart Shopping Cart Using RFID and ZIGBEE"; International Journal on Recent and Innovation trands in Computing and Communication; vol. 5, Issue 2; Jan. 1, 2015.
International Preliminary Report on Patentability Ch. II in International Application No. PCT/US2018/021326, dated May 17, 2019, 14 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

ORDER DETERMINATION METHOD, NON-TRANSITORY COMPUTER-READABLE MEDIUM AND SYSTEM IN AN UNMANNED STORE

This application claims priority to Chinese Patent Application No. 201710132342.2, filed on Mar. 7, 2017, which is incorporated by reference in its entirety.

TECHNICAL FIELD

This disclosure relates to internet technologies and, more particularly, to determination of order information.

BACKGROUND

After selecting items in a traditional physical store, a customer needs to wait in a queue at a cashier's desk for payment, and a cashier conducts payment processing with the assistance of a computer. However, the payment process often has low efficiency, and the wait time can be relatively long. In order to improve efficiency of payment processing, current technology permits analysis of a shopping process of the customer in real time, based on technologies such as computer vision to determine which items are selected or put back by a customer, and modification or confirmation of the customer's order information or shopping list, accordingly. However, there are many factors that can lead to inaccurate determinations during the analysis process. For example, the customer can place a similar item back into an incorrect location, or a wrong determination can be made when several people select items at the same time from a lower rack/shelf which confuses a detection device. These factors can lead to inaccurate determination of order information and adversely affect the payment process.

SUMMARY

The present disclosure describes methods and systems, including computer-implemented methods, computer program products, and computer systems for determining order information in an unmanned store.

In view of the above, the present disclosure provides an order information determination method and apparatus for determining order information of an item more quickly and more accurately, so as to associate the item on an order with a customer.

Specifically, the present disclosure is implemented through the following technical solution:

In a first aspect, an order information determination method is provided, which is used for determining an association between a user and an item selected by the user and includes: acquiring a container identifier (ID) of an item container, the container ID corresponds to a user ID of the user, and the item container is used to contain the item selected by the user; determining a distance between the item and the item container based on location information obtained by locating the item and the item container; and adding item information of the item to an order if the distance is in a predetermined range, the order is associated with the user ID that corresponds to the container ID.

In a second aspect, an order information determination apparatus is provided, which includes: a container determination module configured to obtain a container ID of an item container, the container ID corresponding to a user ID of a user, and the item container is used to contain the item selected by the user; a distance determination module configured to determine a distance between the item and the item container based on location information obtained by locating the item and the item container; and an order processing module configured to add item information of the item to an order if the distance is in a predetermined range, the order is associated with the user ID corresponding to the container ID.

The order information determination method and apparatus in the present disclosure can be used to quickly and accurately determine order information of a customer, and automatically complete payment of an order. The customer can leave immediately after finishing shopping and does not need to wait in a line at a cashier desk for payment. As such, shopping efficiency can be improved to provide good shopping experience.

In an implementation, registration information including a container ID associated with a shopping container is received from a mobile device of a customer shopping at a store. A user account of the customer is associated with the container ID based on the registration information. A radio frequency (RF) signal from an RF tag attached to the shopping container is detected. A plurality of RF signals from a plurality of RF tags are attached to a plurality of corresponding items in the store. The customer at a checkout area of the store is checked out. One or more items of the plurality of items are determined within a predetermined distance from the shopping container based on the RF signal detected from the RF tag attached to the shopping container and the plurality of RF signals detected from the plurality of RF tags attached to the plurality of corresponding items. An order including the determined one or more items is generated, and the order is associated to the customer's user account to be paid by the customer.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, a customer's order information can be automatically updated as items are added to a shopping cart or basket. Second, payment can be made at a checkout region automatically or through mobile devices so the waiting time for check out can be reduced. Third, overall customer experience can be improved.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes technologies related to determining order information in an unmanned store, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Common shopping behavior includes shopping in stores such as supermarkets, shopping malls, or convenience stores. After selecting items to be purchased, a customer needs to wait in line for payment at a cashier's desk near an exit, which can be time-consuming and inconvenient. In order to improve efficiency of shopping, a shopping management system can be used to automatically identify items that are selected by a customer during the shopping process, determine an association between the customer and the selected items, and automatically push an electronic bill to the customer to enable payment to be made by the customer. As such, the customer does not need to wait in line for payment, which can significantly improve shopping efficiency.

One important factor for implementing the above method is to determine an association between the customer and the selected item. A bill for the customer can be obtained after the association is determined. In the present disclosure, such an association can be referred to as "order information", that is, the items selected by the customer. The method provided in the present disclosure can be used to easily and accurately determine order information, to facilitate fast payment.

A convenience store shopping example can be used to illustrate the order information determination method based on the present disclosure. However, the method can also be applied to other scenarios, such as shopping in supermarkets, shopping malls, or inventory monitoring in a warehouse (which inventory items in the warehouse are taken by whom), library book management (which books are borrowed by a certain user), and other similar scenarios where an association between a person and items needs to be determined.

Figure 1:
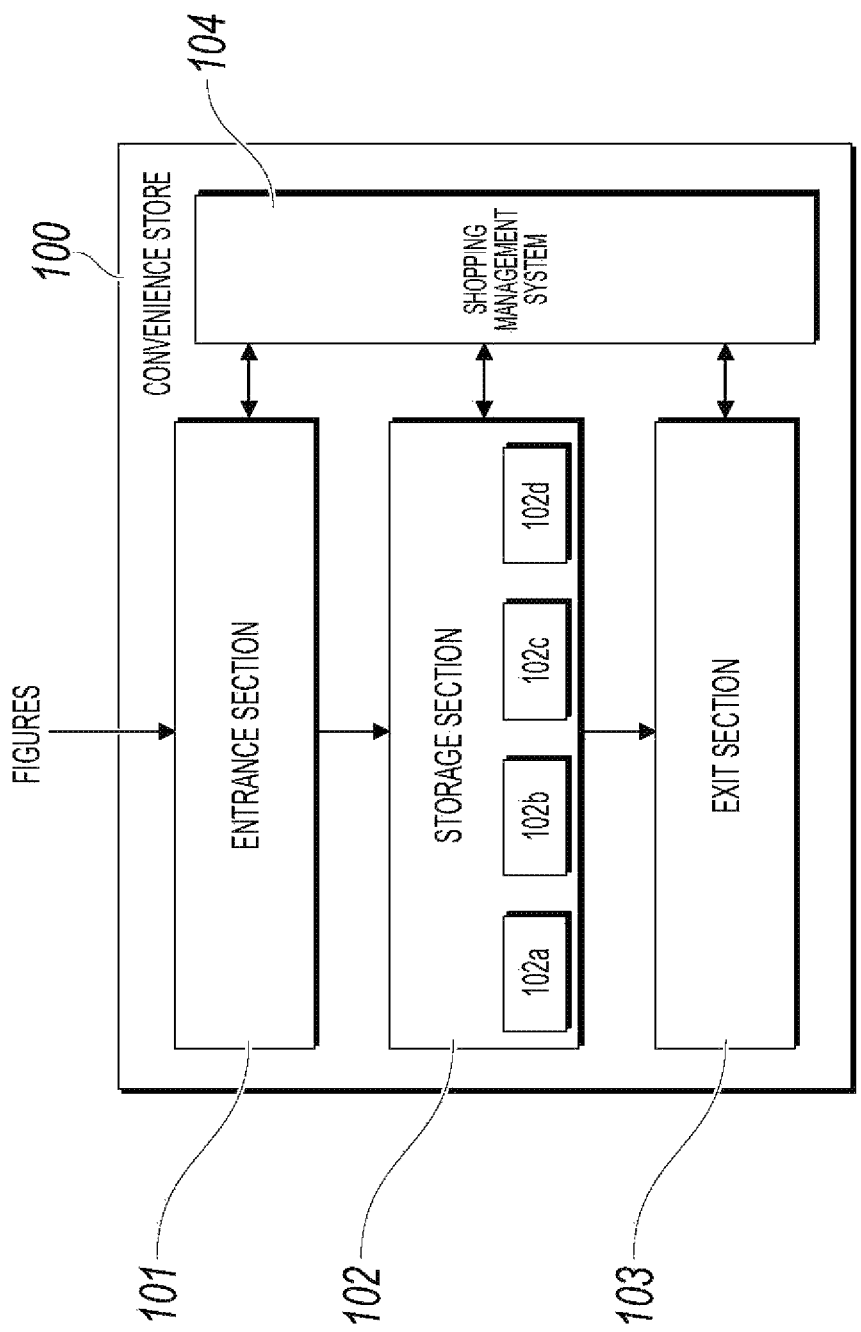
FIG. 1 is a schematic diagram showing a sectional layout of a convenience store, according to an implementation of the present disclosure.

FIG. 1 is a schematic diagram showing a sectional layout of a convenience store 100, according to an implementation of the present disclosure. As shown in FIG. 1, the convenience store 100 can include an entrance section 101, a storage section 102, and an exit section 103. A customer can enter the convenience store 100 using the entrance section 101, select items in the storage section 102, and leave the convenience store using the exit section 103. The storage section 102 can store many kinds of items. For example, 102a to 102d illustrated in FIG. 1 are example items in the convenience store, which can include fruit, drinks, milk, and bread. FIG. 1 only illustrates some of the items, and an actual storage section 102 can include more items. The layout of the convenience store shown in FIG. 1 is a functional sectional division rather than an actual physical sectional division. In an example, more than one entrance section 101, storage section 102, and exit section 103 can be in a combined layout instead of being separately arranged.

The convenience store 100 in FIG. 1 can further include a shopping management system 104. The shopping management system 104 can perform communication interaction with the entrance section 101, the storage section 102, and the exit section 103.

Figure 2:
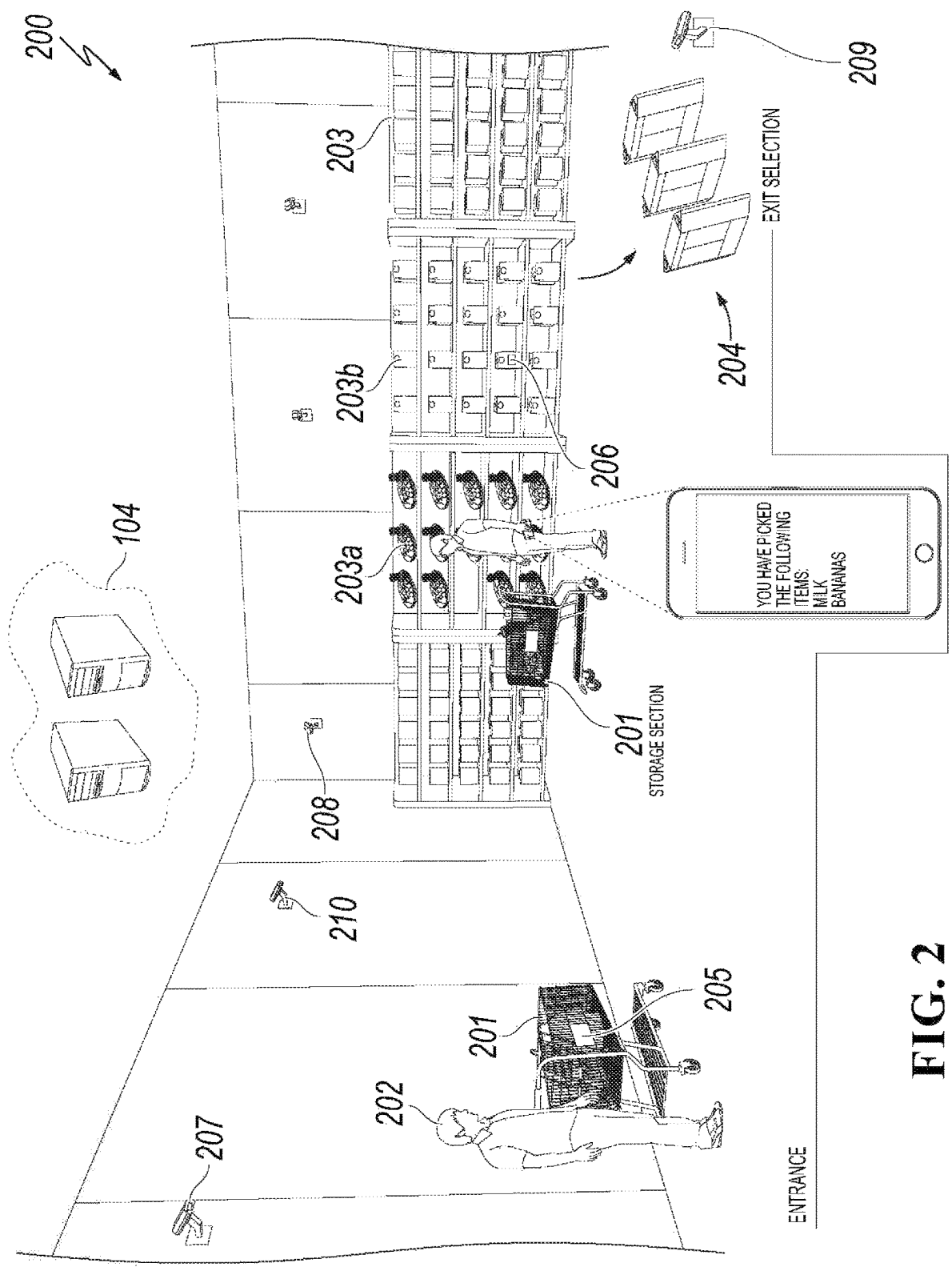
FIG. 2 is a detailed schematic diagram showing a layout of a convenience store, according to an implementation of the present disclosure.

Referring to FIG. 2, FIG. 2 is a detailed schematic diagram showing a layout of a convenience store 200, according to an implementation of the present disclosure. For example, some shopping carts 201 can be placed in the entrance section 101 of the convenience store 100, and the customer 202 can push one shopping cart 201 to hold selected items when entering the convenience store. In other examples, the shopping cart 201 can also be replaced with a shopping basket, a shopping bag, or other containers. Some storage racks 203 can be placed in the storage section 102, and many kinds of items can be placed on the storage racks 203, such as bananas 203a and milk 203b, as illustrated in FIG. 2. The customer can place the items selected into the shopping cart 201. After shopping is done, the customer can enter the exit section of the convenience store, and push the shopping cart 201 to exit the convenience store using an exit lane 204, without waiting in a line for payment. One exit lane 204 can normally allow one person pushing the shopping cart to pass sequentially.

In an example, the present disclosure can attach radio frequency identification (RFID) tags to each shopping cart and to each item. For example, in FIG. 2, an RFID tag 205 is attached to the shopping cart, and an RFID tag 206 is attached to the item on the storage rack 203. Each shopping cart is attached with a different tag, and the tag includes identification information of each shopping cart. Similarly, tags on different items can contain different information, and the tag includes identification information of a corresponding item.

As shown in FIG. 2, multiple RFID readers for receiving RFID tag signals can be installed in the convenience store at locations such as on the wall or the roof. For example, a first reader 207 can be installed in the entrance section, a second reader 208 can be installed in the storage section, and a reader 209 can be installed in the exit section. The readers can transmit received RFID tag information to the shopping management system 104. The shopping management system 104 can store and process the information. In addition, monitoring devices such as a camera 210 can be installed in the convenience store. These monitoring devices can be used for video surveillance in the store, and the monitoring information can be transmitted to the shopping management system 104. The shopping management system 104 can also transmit information in the shopping management system to be presented on other devices by using network devices such as a wireless antenna installed in the store. For example, the information can be transmitted to a smart phone carried by the customer, such that the customer can conveniently check the information obtained by the shopping management system on the mobile phone.

The shopping management system 104 can be a local or remote server system, which can include several computing and processing devices. For example, FIG. 2 illustrates two computing devices, and there can be more computing devices in actual implementations.

Figure 3:
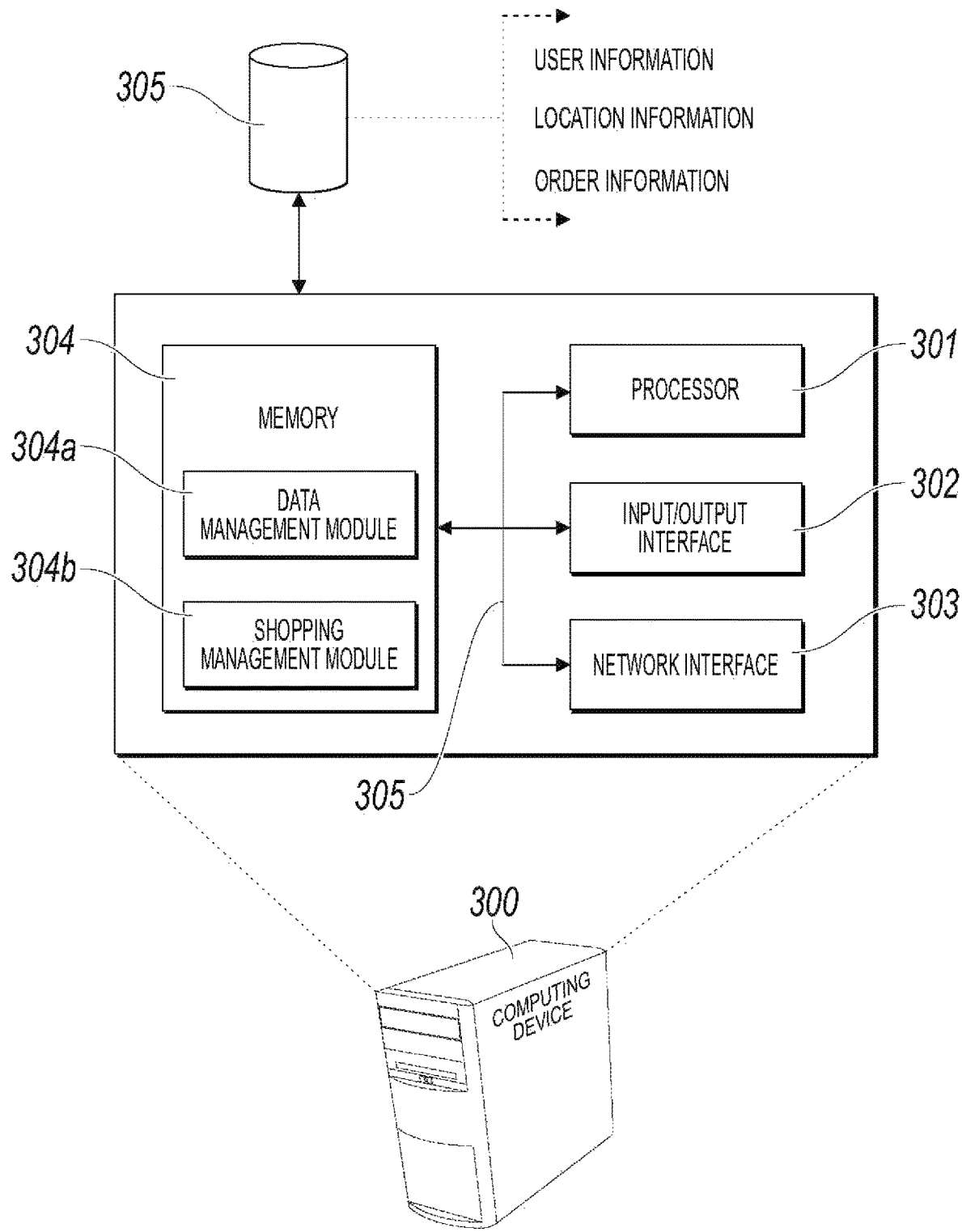
FIG. 3 is a schematic diagram showing structure of a computing device, according to an implementation of the present disclosure.

Turning to FIG. 3, FIG. 3 is a schematic diagram showing structure of a computing device 300, according to an implementation of the present disclosure. In FIG. 3, a computing device 300 can include a processor 301, an input/output interface 302, a network interface 303, and a memory 304. The processor 301, the input/output interface 302, the network interface 303, and the memory 304 can be connected and communicate with each other using a bus. FIG. 3 only illustrates some of the components, and an actual computing device 300 can include more or fewer components. The memory 304 can further include a data management module 304a and a shopping management module 304b. These modules can be in the form of hardware or software, and when the modules are in the form of software, they can be computer executable programs.

For example, the computing device 300 can receive, through the network interface 303, information transmitted by devices such as an RFID tag and a camera in the convenience store, and process the information (which will be described in detail in the subsequent examples) such as location information, obtained by locating a shopping cart or an item through an RFID tag, or member ID information transmitted by the customer. The processor 301 can process the received information by executing an instruction of the shopping management module 304b to obtain latest data, such as information of a customer who has newly entered a convenience store, item location information, shopping cart location information, or the customer's order information. Moreover, the processor 301 can update the data into a database 305 by executing instructions of the data management module 304a.

In an example, the database 305 can store data. For example, the data can include user information, location information, and order information. The user information can be member IDs of registered users of the shopping management system, the location information can be information obtained by locating the item and the shopping cart described in the subsequent examples, and the order information can include information about selected items. Moreover, the computing device 300 can update the information based on the latest data received. For example, the user information can be updated when a new user is registered, the location information of an item can be updated by locating the item in real-time, and further, the order information can be updated when items in an order have changed. In addition, the computing device 300 can also output the data from the database. For example, the order information can be pulled from the database and transmitted to other devices such as the customer's mobile phone, such that the customer can check the information.

Figure 4:
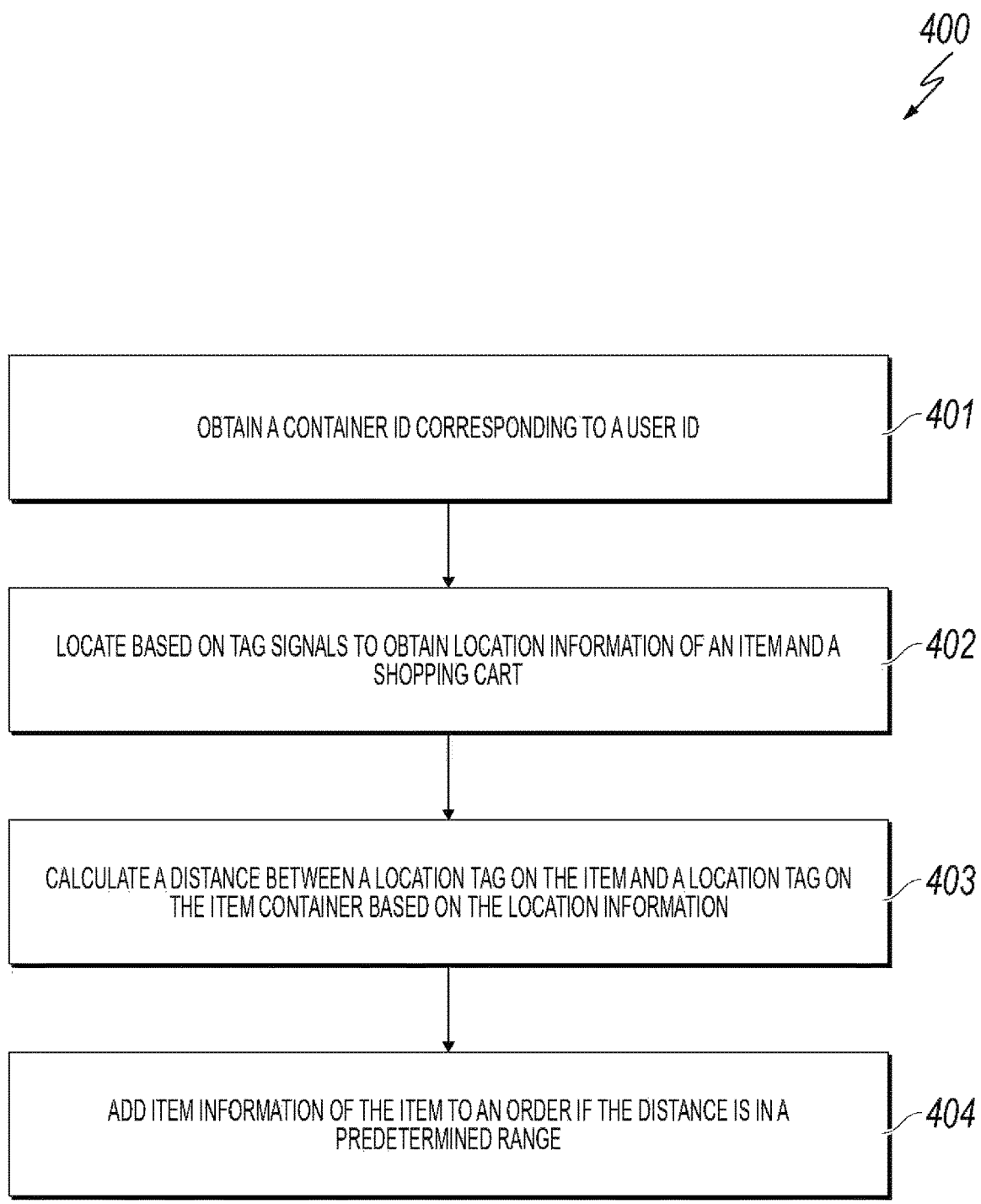
FIG. 4 is a flowchart showing an order information determination method, according to an implementation of the present disclosure.

FIG. 4 is a flowchart showing an order information determination method 400, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

When a customer enters a convenience store to purchase items, the customer can push a shopping cart from an entrance section, select items from a storage rack to the shopping cart during the shopping process, and directly push the shopping cart to leave the convenience store from an exit section after the shopping is done. During this process, the shopping management system can execute the method in FIG. 4 to complete the order information determination, that is, to determine which items in the convenience store are selected by the customer.

When a customer enters a convenience store to purchase items, the customer can push a shopping cart from an entrance section. A two-dimensional (2D) code and an RFID tag can be attached to the shopping cart. The 2D code can include an ID of the shopping cart. Different shopping carts can have different IDs. In this example, the shopping cart is used to hold items. In specific implementations, the item container used to hold items selected by a user is not necessarily a shopping cart, and can also be, for example, a shopping basket, or a shopping case. The 2D code attached to the item container can include a container ID for identifying the container, such as an ID of a shopping basket.

At 401, a user scans the 2D code on the shopping cart by using shopping software installed on his/her own smartphone. The shopping software can be client software of the shopping management system, and the user is logged in to a member ID registered with the client software. The member ID can be referred to as a user ID. When the user scans the 2D code through the client software, the member ID can be bound with the ID of the shopping cart. The client can further upload the ID of the shopping cart to the shopping management system. As such, the shopping management system can receive binding information between the member ID and the ID of the shopping cart, or equivalently, learn which shopping cart is used by which user. The shopping management system can store the corresponding relationship into a database 305.

The user can push the shopping cart into a storage section to select items. In the entire convenience store, RFID tags attached to the shopping cart and items can be located through an RFID reader 208 or a detector installed in the store. For example, the reader 208 can receive tag signals sent by the RFID tags attached to items and item containers. The tag signals can include item information and a container ID. For example, the item information can include an item code to uniquely identify the item. From step 401, method 400 proceeds to 402.

At 402, the reader 208 transmits the tag signals to the shopping management system. The shopping management system can perform location calculation based on the tag signals to obtain location information of the location tag attached to the item and location information of the location tag attached to the item container. For example, with reference to FIG. 3, the processor 301 on the computing device can execute executable code included in the shopping management module 304b, perform location calculation based on the tag signals, and store the calculated location information into the database 305 by executing executable code in the data management module 304a. The location calculation performed in this step can be based on an ordinary RFID location technology. From step 402, method 400 proceeds to 403.

At 403, the shopping management system calculates a distance between the location tag on the item and the location tag on the item container based on the location information. The distance between the two tags can correspond to a distance between the item and the shopping cart. Moreover, the shopping management system can further set a predetermined distance range w, where w=[0, d], d>0, and w is a distance range. Whether the distance between the two tags is within the predetermined range can be determined. From step 403, method 400 proceeds to 404.

At 404, if the distance is within the predetermined range, item information of the item is added to an order, and the order associated with the user ID corresponding to the container ID. That is, the item is added to the order of the user, indicating that the user has selected the item and put it into the shopping cart. If the distance is not within the predetermined range, the item is not added to the order, and the indication is that the user has not selected the item.

During the order information determination according to the present disclosure, an item and a shopping cart can be located, and then a corresponding order that includes the item is determined, which makes order determination more accurate. For example, even when many customers select items from a storage rack at the same time, relative location between each item and a shopping cart is determined. Whether an item has been added to a customer's order can be determined when the distance is short and falls within the predetermined range. As another example, even if the user puts a similar item back in a wrong position, the determination of a location relationship between the item and the shopping cart will not be affected. Since the method may not be affected by interference factors, it is more accurate in determining the items included in a customer's order.

The above method of determining items in an order based on distances between the items and the shopping cart can be performed at any time after the user enters the convenience store. In other words, after the user scans the 2D code on the shopping cart by using a shopping software on the smart phone, the shopping management system can start to locate the RFID tag on the shopping cart, and can perform real-time monitoring of locations of the items in the convenience store. After step 404, method 400 stops.

Figure 5:
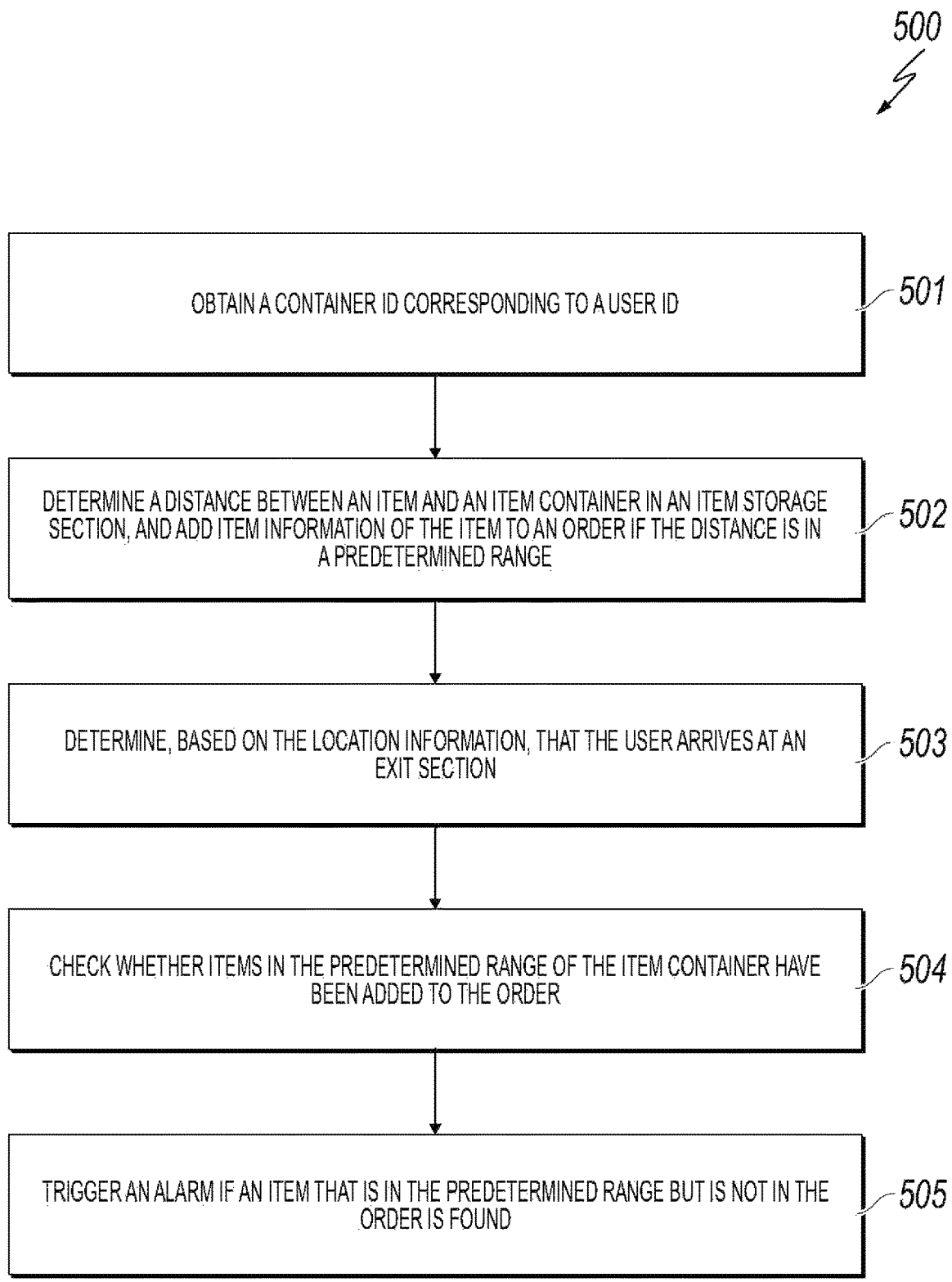
FIG. 5 is a flowchart showing an order information determination method, according to an implementation of the present disclosure.

In an example, FIG. 5 is a flowchart showing an order information determination method 500, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 501, after scanning a 2D code on a shopping cart, a user pushes the shopping cart to start shopping in a convenience store. At this time, the shopping management system has obtained a container ID corresponding to a user ID and determined which shopping cart is used by the user to hold items. From step 501, method 500 proceeds to 502.

At 502, when the user selects items from an item storage section, the shopping management system can locate the user's shopping cart in the convenience store at any time, and add item information of the corresponding item to the user's order when the distance between the item and the shopping cart is within a predetermined range w.

When adding the item to the user's order, the shopping management system can update the order information in the database 305, that is, the item selected in the user's order can be updated. Moreover, the shopping management system can further send the order information to the user's smart phone. As shown in FIG. 3, a client software installed on the user's smart phone can have a shopping cart information user interface that can display a list of items as order information. The user can see the following information: "You have the following items in the cart: bananas and apples", such that the user can monitor changes of the order at any time. Moreover, the quantity of items selected by the user or other information such as origins of the items can be displayed.

The shopping management system can locate the items in the shopping cart and the convenience store in real time, and can be aware of changes in their locations. If it is found that a distance between an item and the shopping cart changes from within the predetermined range to outside of the predetermined range, a possibility is that the user put the item into the shopping cart and then put the item back to the storage rack because the item is no longer wanted. As such, the shopping management system can remove the item from the order. From step 502, method 500 proceeds to 503.

At 503, when the shopping management system determines, based on location information obtained based on the RFID tag, that the user arrives at an exit section, the management system indicates that the user has finished shopping and wants to leave the convenience store.

At 504, the shopping management system can check the order again. For example, the shopping management system can identify and locate the shopping cart and the item to determine their relative locations. If the distance between the shopping cart and the item is within the predetermined range w, it can be determined whether the item has been added to the order that corresponds to the user's shopping cart. From step 504, method 500 proceeds to 505.

At 505, if the distance between an item and the shopping cart is within the distance w, but the item is not included in the order, an alarm can be triggered.

After being triggered, the alarm can be automatically dismissed if the item is put back to a section where it was retrieved; otherwise, human intervention can be performed. With reference to FIG. 2, multiple cameras can be installed in the convenience store, such as the camera 210. Video information collected by the camera can also be transmitted to the shopping management system and stored in the database. After an alarm is triggered, video footage can be retrieved for human intervention. In addition, if the shopping management system determines that the location of an RFID tag of an item in the convenience store is missing, it is possible that the RFID tag on the item has been damaged. In such case, the shopping management system can also, automatically, trigger an alarm to start a human intervention process.

In other examples, whether the distance between the item and the item container is within a predetermined range w can be determined based on locations of the item and the item container when a user arrives at the exit section. That is, an association between the item and the shopping cart can be determined at the exit section, to determinate order information. Determination of the order information may not need to be conducted in the storage section. In addition, the present disclosure does not limit the use of other auxiliary determination technologies to assist the determination of order information. For example, assistance can be provided in capturing video footage, or multiple auxiliary sensors can be provided.

After determining the order information, the shopping management system can generate a waiting-for-payment bill and push the bill to the user. The user can pay in a capital account corresponding to its member ID. The user needs to have sufficient balance in the capital amount or be able to connect to other payment methods having sufficient balance to pay the bill; otherwise, the user can be prohibited from leaving with items exceeding the user's payment capability or an alarm device can be triggered to alert the user.

In some examples disclosed in the present disclosure, the RFID tags are attached to the items and the shopping cart. The item and the shopping cart can be located by using the RFID tags. The specific implementations may not be limited to those examples. Locations can also be determined in other manners. Other location tags can be attached to the items and the shopping cart, and other corresponding positioning technologies can be adopted.

The method in the present disclosure can be used to quickly and accurately determine a customer's order information, and automatically complete payment. The customer can leave immediately after the shopping is done, without waiting in line at a cashier's desk to make payment. The shopping efficiency can be enhanced, and a good shopping experience can be provided. After 505, method 500 stops.

Figure 6:
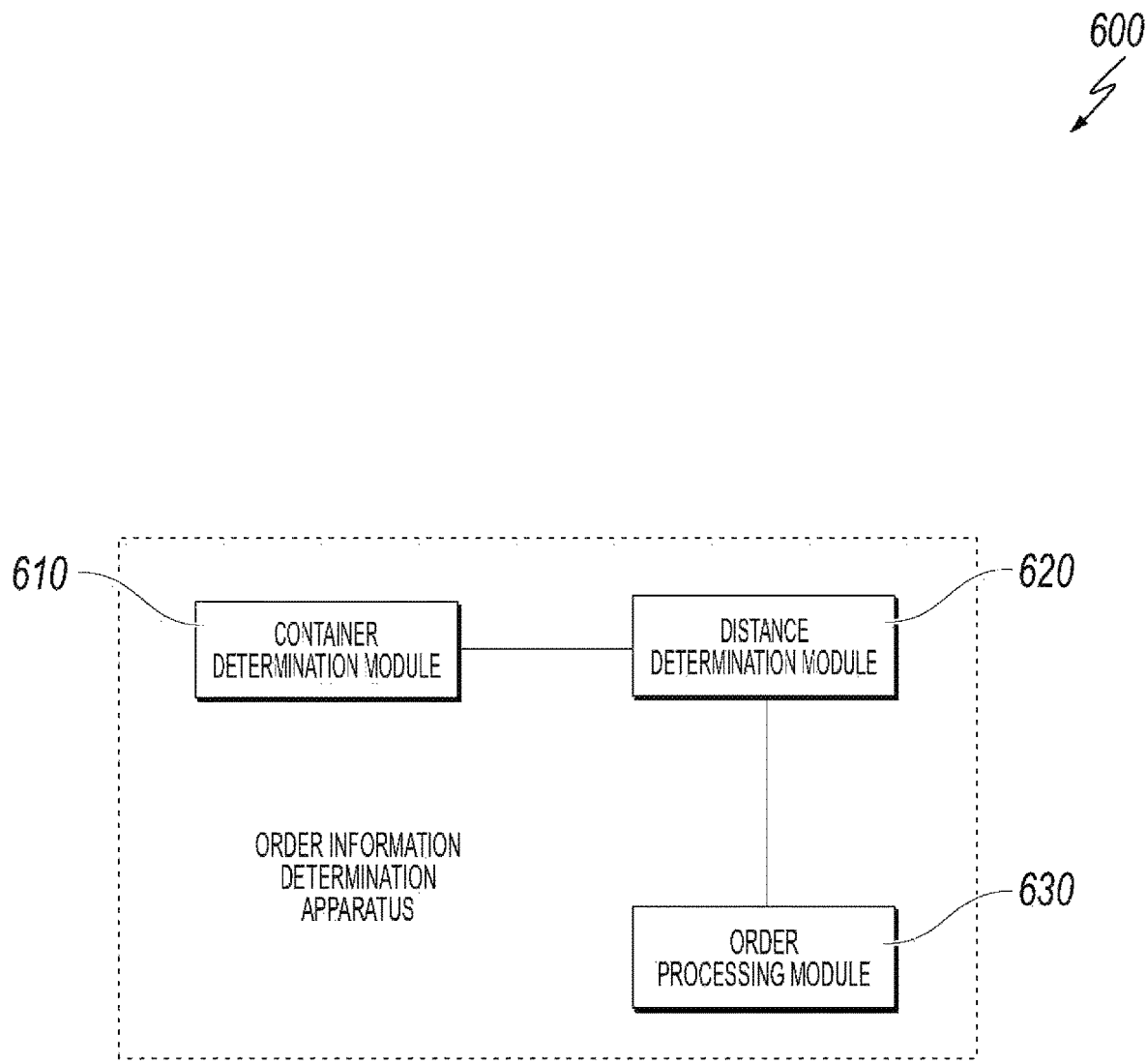
FIG. 6 is a schematic diagram showing structure of an order information determination apparatus, according to an implementation of the present disclosure.

The present disclosure further provides an order information determination apparatus, which can be included in the shopping management module as discussed in the description of FIG. 3 or the shopping management system as discussed in the description of FIG. 1. FIG. 6 is a schematic diagram showing structure of an order information determination apparatus 600, according to an implementation of the present disclosure. In FIG. 6, the apparatus include: a container determination module 610, a distance determination module 620, and an order processing module 630.

The container determination module 610 can be configured to obtain a container ID of an item container, the container ID can correspond to a user ID of the user, and the item container can be used to hold the items selected by the user.

The distance determination module 620 can be configured to determine a distance between the items and the item container based on location information obtained for the items and the item container.

The order processing module 630 can be configured to add item information to an order if the distance between the item and the item container is within a predetermined range, where the order corresponds to the container ID and is associated with the user ID.

In an example, the distance determination module 620 can be specifically configured to receive tag signals sent by location tags on the item and the item container, the tag signals including the item information and the container ID; locate the location tags based on the tag signals to obtain location information of the location tags on the items and item container respectively; and calculate a distance between the location tag on the item and the location tag on the item container based on the location information.

In an example, the distance determination module 620 can be further configured to determine, based on location information, that the user arrives at an exit section.

In an example, the order processing module 630 can be specifically configured to determine a distance between the item and the item container in an item storage section, and add item information of the item to an order if the distance is within a predetermined range; check whether the item in a predetermined range of the item container is added to the order, when the user is determined to have arrived at the exit section; and trigger an alarm if an item is within the predetermined range but is not included in the order.

The order information determination apparatus 600 or modules illustrated in the previously described implementations can be specifically implemented by using a computer chip or an entity, or a product having a certain function. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For simplicity of description, when an apparatus is described, it can be divided into various units in terms of functions to be respectively description. Indeed, when the present disclosure is implemented, functions of the modules can be implemented using the same or multiple pieces of software or hardware.

The technical carrier involved in the payment in the implementations of the present application may, for example, include Near Field Communication (NFC), WIFI, 3G/4G/5G, POS card swiping technology, 2D code scanning technology, bar code scanning technology, Bluetooth, infrared ray, Short Message Service (SMS), and Multimedia Message Service (MIMS).

The above description is merely relatively preferred implementations of the present disclosure, and are not intended to limit the present disclosure. Any modification, equivalent substitution, improvement or the like made without departing from the spirit and principle of the present disclosure should fall within the scope of the present disclosure.

Figure 7:
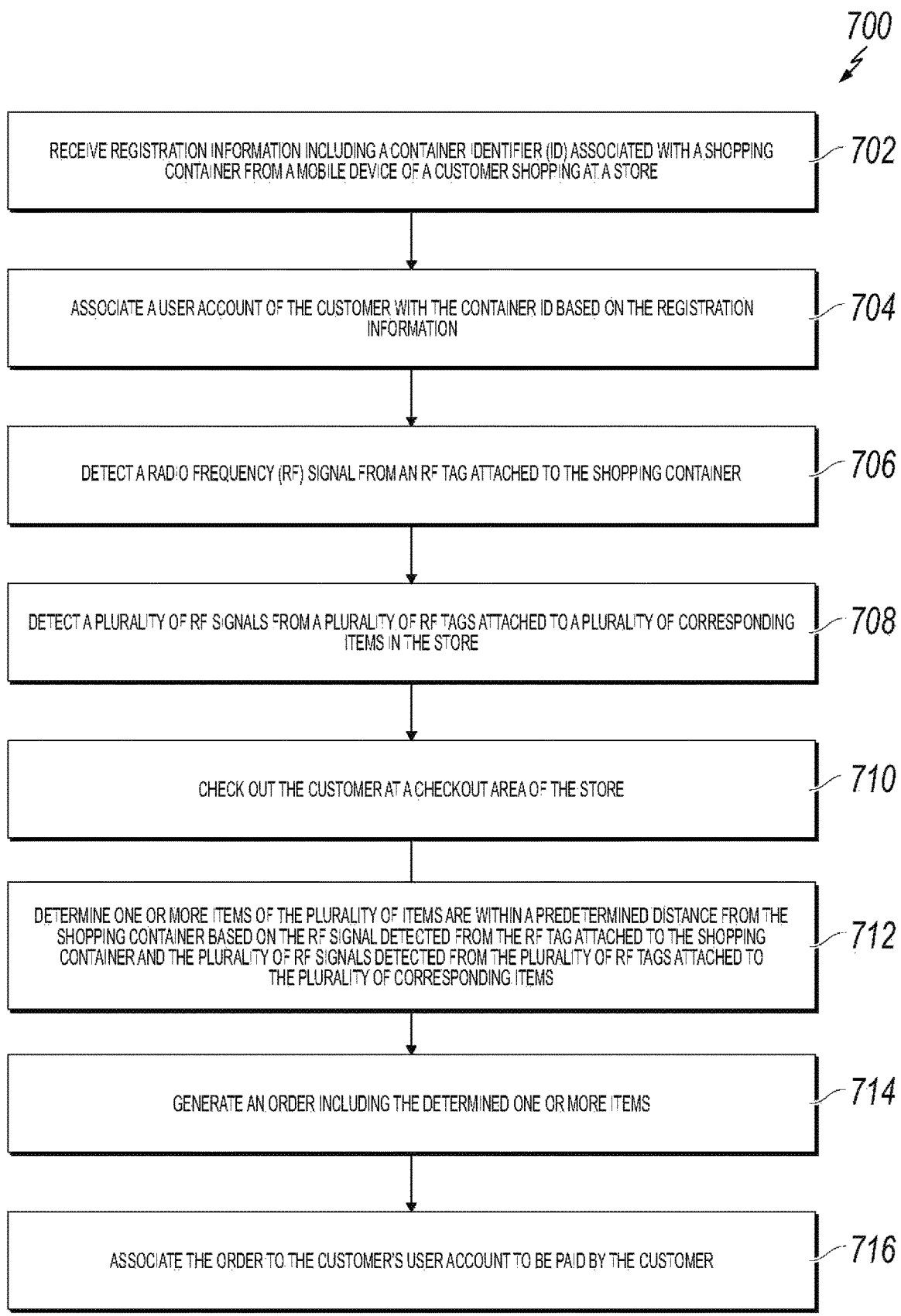
FIG. 7 is a flowchart illustrating an example of a computer-implemented method for determining order information in an unmanned store, according to an implementation of the present disclosure.

FIG. 7 is a flowchart illustrating an example of a computer-implemented method 700 for determining order information in an unmanned store, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, registration information including a container ID associated with a shopping container is received from a mobile device of a customer shopping at a store. The shopping container can be a shopping cart or shopping basket used to hold items selected by the customer at the store. The registration information can be obtained by scanning a quick response (QR) code attached to the shopping container. The scanned QR code can correspond to the container ID uniquely associated with the shopping container. In some cases, the customer can log on to a user account of an application associated with shopping at the store installed on the user's mobile device. The customer can scan the QR code attached to the shopping container using the application. From 702, method 700 proceeds to 704.

At 704, the customer's user account is associated with the container ID based on the registration information. In some cases, the user account of the customer can be associated with the container ID based on using the application associated with the customer's user account to scan the QR code to retrieve the container ID of a shopping container. In some cases, the user can register at or near the entrance of the store to generate a user account. A shopping management system can be used to associate the user account with a container ID associated with a shopping container selected by the user. For example, the customer can present a QR code associated with a user account to a QR code scanner at or near the entrance of the store, the customer's user account ID can be scanned and saved by the shopping management system. When the customer selects a shopping container, the shopping management system can associate the container ID of the shopping container with the user account. Aside from scanning a QR code from a customer's mobile device, other identity recognition methods, such as identifying through Bluetooth or near field communications (NFC) from a Bluetooth or NFC enabled device of the customer, can be used. In some cases, biometric recognition or authentication methods can be used to identify or provide a customer's user account. For example, a customer can use facial recognition or input the user fingerprint information to enable the shopping management system to identify a user account. The shopping management system can then associate the identified user account to a shopping container selected by the user. From 704, method 700 proceeds to 706.

At 706, a radio frequency (RF) signal is detected from an RF tag attached to the shopping container. The RF tag can be an RFID or other sensor that can emit RF signal to identify the article it is attached to. The RF signal can be detected by one or more RF detectors installed in the store to determine the location of the shopping container. In some cases, the location of the shopping container can be determined in real-time. In some cases, the location of the shopping container can be updated based on the RF signal periodically. In some cases, the location of the shopping container can be determined based on the RF signal after the customer enters a check out region. From 706, method 700 proceeds to 708.

At 708, a plurality of RF signals can be detected from a plurality of RF tags attached to a plurality of corresponding items in the store. Similarly, the plurality of RF signals can be detected to determine the locations of the corresponding plurality of items. From 708, method 700 proceeds to 710.

At 710, the customer is checked out at a checkout area of the store. The customer check out can be activated when the customer enters the checkout area of the store. From 710, method 700 proceeds to 712.

At 712, one or more items of the plurality of items are determined to be within a predetermined distance from the shopping container based on the RF signal detected from the RF tag attached to the shopping container and the plurality of RF signals detected from the plurality of RF tags attached to the plurality of corresponding items. After a checkout process starts, the shopping management system can determine which items are included in the customer's order. In other words, items included in the customer's order can be items selected by the customer and put into the shopping container. This can be determined based on relative locations of the items and the shopping container. If the locations of the items determined from the corresponding detected RF signals are within a predetermined distance (for example, 1 meter), the items are determined to be included in the customer's order. From 712, method 700 proceed to 714.

At 714, an order including the determined one or more items are generated. From 714, method 700 proceeds to 716.

At 716, the order is associated to the customer's user account to be paid by the customer. In some cases, the order information can be sent to the customer's user account. The customer can review, confirm, or pay the order by using an application associated with the user account or from a checkout device installed in the store. In some cases, the shopping management system can automatically charge the user account when the customer leaves the checkout area or exits the store.

The checkout area can be in proximity to the exit of the store. In some cases, an alarm can be sent to the shopping management system if a location of an item is determined to be within the predetermined distance from the location of the shopping container but is not included in the order, or an RF signal of an item is no longer detectable. In some cases, human intervention can be used to determine if the item has failed to be registered to the order or the RF tag is damaged. After step 716, method 700 stops.

Figure 8:
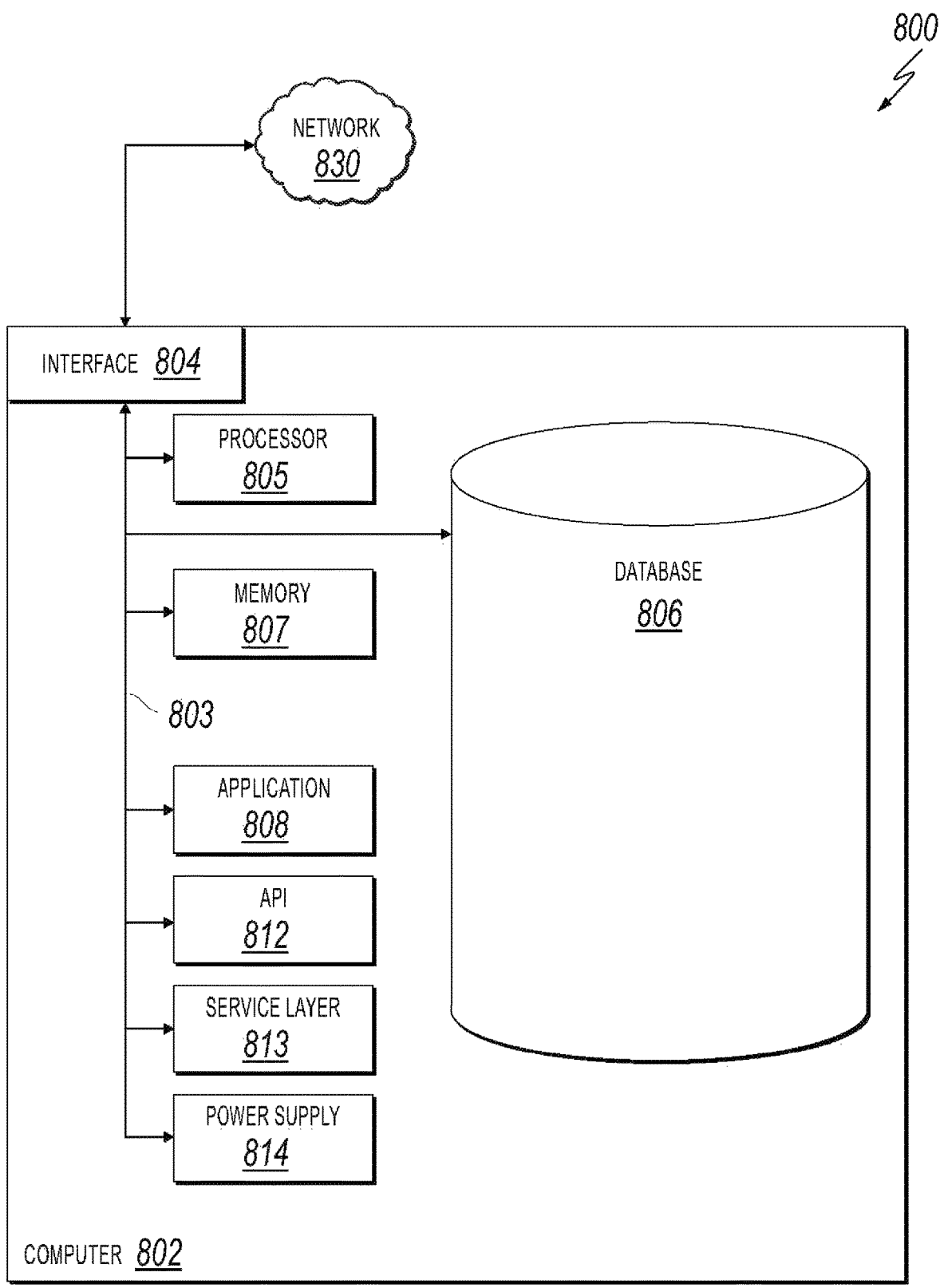
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented System 800 used to provide computational functionalities associated with described algorithms, methods, functions, processes, flows, and procedures, according to an implementation of the present disclosure. In the illustrated implementation, System 800 includes a Computer 802 and a Network 830.

The illustrated Computer 802 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 802 can include an input device, such as a keypad, keyboard, touch screen, another input device, or a combination of input devices that can accept user information, and an output device that conveys information associated with the operation of the Computer 802, including digital data, visual, audio, another type of information, or a combination of types of information, on a graphical-type user interface (UI) (or GUI) or other UI.

The Computer 802 can serve in a role in a distributed computing system as a client, network component, a server, a database or another persistency, another role, or a combination of roles for performing the subject matter described in the present disclosure. The illustrated Computer 802 is communicably coupled with a Network 830. In some implementations, one or more components of the Computer 802 can be configured to operate within an environment, including cloud-computing-based, local, global, another environment, or a combination of environments.

At a high level, the Computer 802 is an electronic computing device operable to receive, transmit, process, store, or manage data and information associated with the described subject matter. According to some implementations, the Computer 802 can also include or be communicably coupled with a server, including an application server, e-mail server, web server, caching server, streaming data server, another server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory, conventional, or another type of database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The Application 808 is an algorithmic software engine providing functionality according to particular needs, desires, or particular implementations of the Computer 802, particularly with respect to functionality described in the present disclosure. For example, Application 808 can serve as one or more components, modules, or applications. Further, although illustrated as a single Application 808, the Application 808 can be implemented as multiple Applications 808 on the Computer 802. In addition, although illustrated as integral to the Computer 802, in alternative implementations, the Application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

Described implementations of the subject matter can include one or more features, alone or in combination.

For example, in a first implementation, a computer-implemented method, comprising: receiving registration information including a container ID associated with a shopping container from a mobile device of a customer shopping at a store; associating a user account of the customer with the container ID based on the registration information; detecting an RF signal from an RF tag attached to the shopping container; detecting a plurality of RF signals from a plurality of RF tags attached to a plurality of corresponding items in the store; checking out the customer at a checkout area of the store; determining one or more items of the plurality of items are within a predetermined distance from the shopping container based on the RF signal detected from the RF tag attached to the shopping container and the plurality of RF signals detected from the plurality of RF tags attached to the plurality of corresponding items; generating an order including the determined one or more items; and associating the order to the customer's user account to be paid by the customer.

The foregoing and other described implementations can each, optionally, include one or more of the following features:

A first feature, combinable with any of the following features, determining location of the shopping container based on the detected RF signal from the RF tag attached to the shopping container; and determining locations of the plurality of items based on the detected RF signals from the plurality of RF tags attached to the plurality of corresponding items.

A second feature, combinable with any of the previous or following features, further comprising adding an item of the plurality of items to the order when the determined location of the item is within the predetermined distance from the determined location of the shopping container.

A third feature, combinable with any of the previous or following features, wherein the registration information is generated by scanning a QR code attached to the shopping container using the mobile device.

A fourth feature, combinable with any of the previous or following features, wherein associating the user account of the customer with the container ID is further based on an application associated with the user account used to scan the QR code or a QR code associated with the user account scanned from the mobile device of the customer.

A fifth feature, combinable with any of the previous or following features, wherein the RF tag is an RFID and the RF signal is an RFID signal.

A sixth feature, combinable with any of the previous or following features, wherein the checkout area is in proximity to an exit of the store; and the method further comprising sending an alarm if a location of an item is determined to be within the predetermined distance from the determined location of the shopping container but is not included in the order.

A seventh feature, combinable with any of the previous or following features, further comprising sending an alarm when an RF signal is not detected from an item of the plurality of the items.

In a second implementation, a non-transitory, computer-readable medium storing one or more instructions executable by a computer system to perform operations comprising: receiving registration information including a container ID associated with a shopping container from a mobile device of a customer shopping at a store; associating a user account of the customer with the container ID based on the registration information; detecting an RF signal from an RF tag attached to the shopping container; detecting a plurality of RF signals from a plurality of RF tags attached to a plurality of corresponding items in the store; checking out the customer at a checkout area of the store; determining one or more items of the plurality of items are within a predetermined distance from the shopping container based on the RF signal detected from the RF tag attached to the shopping container and the plurality of RF signals detected from the plurality of RF tags attached to the plurality of corresponding items; generating an order including the determined one or more items; and associating the order to the customer's user account to be paid by the customer.

The foregoing and other described implementations can each, optionally, include one or more of the following features:

A first feature, combinable with any of the following features, determining location of the shopping container based on the detected RF signal from the RF tag attached to the shopping container; and determining locations of the plurality of items based on the detected RF signals from the plurality of RF tags attached to the plurality of corresponding items.

A second feature, combinable with any of the previous or following features, further comprising adding an item of the plurality of items to the order when the determined location of the item is within the predetermined distance from the determined location of the shopping container.

A third feature, combinable with any of the previous or following features, wherein the registration information is generated by scanning a QR code attached to the shopping container using the mobile device.

A fourth feature, combinable with any of the previous or following features, wherein associating the user account of the customer with the container ID is further based on an application associated with the user account used to scan the QR code or a QR code associated with the user account scanned from the mobile device of the customer.

A fifth feature, combinable with any of the previous or following features, wherein the RF tag is an RFID and the RF signal is an RFID signal.

A sixth feature, combinable with any of the previous or following features, wherein the checkout area is in proximity to an exit of the store; and the method further comprising sending an alarm if a location of an item is determined to be within the predetermined distance from the determined location of the shopping container but is not included in the order.

A seventh feature, combinable with any of the previous or following features, further comprising sending an alarm when an RF signal is not detected from an item of the plurality of the items.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving registration information including a container ID associated with a shopping container from a mobile device of a customer shopping at a store; associating a user account of the customer with the container ID based on the registration information; detecting an RF signal from an RF tag attached to the shopping container; detecting a plurality of RF signals from a plurality of RF tags attached to a plurality of corresponding items in the store; checking out the customer at a checkout area of the store; determining one or more items of the plurality of items are within a predetermined distance from the shopping container based on the RF signal detected from the RF tag attached to the shopping container and the plurality of RF signals detected from the plurality of RF tags attached to the plurality of corresponding items; generating an order including the determined one or more items; and associating the order to the customer's user account to be paid by the customer.

The foregoing and other described implementations can each, optionally, include one or more of the following features:

A first feature, combinable with any of the following features, determining location of the shopping container based on the detected RF signal from the RF tag attached to the shopping container; and determining locations of the plurality of items based on the detected RF signals from the plurality of RF tags attached to the plurality of corresponding items.

A second feature, combinable with any of the previous or following features, further comprising adding an item of the plurality of items to the order when the determined location of the item is within the predetermined distance from the determined location of the shopping container.

A third feature, combinable with any of the previous or following features, wherein the registration information is generated by scanning a QR code attached to the shopping container using the mobile device.

A fourth feature, combinable with any of the previous or following features, wherein associating the user account of the customer with the container ID is further based on an application associated with the user account used to scan the QR code or a QR code associated with the user account scanned from the mobile device of the customer.

A fifth feature, combinable with any of the previous or following features, wherein the RF tag is an RFID and the RF signal is an RFID signal.

A sixth feature, combinable with any of the previous or following features, wherein the checkout area is in proximity to an exit of the store; and the method further comprising sending an alarm if a location of an item is determined to be within the predetermined distance from the determined location of the shopping container but is not included in the order.

A seventh feature, combinable with any of the previous or following features, further comprising sending an alarm when an RF signal is not detected from an item of the plurality of the items.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a shopping management system, registration information including a container identifier (ID) associated with a shopping container from a mobile device of a customer shopping at a store;
   associating, by the shopping management system, a user account of the customer with the container ID based on the registration information;
   generating, by the shopping management system, an order associated with the container ID;
   detecting, by the shopping management system, a radio frequency (RF) signal from an RF tag attached to the shopping container using a plurality of radio frequency identification (RFID) readers installed in a shopping area of the store;
   determining, by the shopping management system, a location of the shopping container in the store by performing a location calculation based on the RF signal from the RF tag attached to the shopping container;
   detecting, by the shopping management system, a plurality of RF signals from a plurality of RF tags attached to a plurality of corresponding items in the store using the plurality of RFID readers installed in the shopping area of the store;
   determining, by the shopping management system, a plurality of locations of the plurality of corresponding items in the store by performing a location calculation based on the plurality of RF signals from the plurality of RF tags attached to the plurality of corresponding items;
   adding, by the shopping management system, an item of the plurality of corresponding items to the order when the location of the item is within a predetermined distance from the location of the shopping container;
   removing, by the shopping management system, a particular item in the order when the location of the particular item is outside the predetermined distance from the location of the shopping container;
   determining, by the shopping management system according to the location of the shopping container, that the customer arrives at a checkout area of the store; and
   checking out, by the shopping management system, the customer at the checkout area of the store, wherein checking out the customer includes:
      determining, by the shopping management system, one or more items in the shopping container at the checkout area of the store, wherein the one or more items are within the predetermined distance from the shopping container based on the RF signal detected from the RF tag attached to the shopping container and one or more RF signals detected from one or more RF tags attached to the one or more items;
      checking, by the shopping management system, items in the order with the one or more items in the shopping container;
         wherein the checking triggers an alarm for an item that is determined to be within the predetermined distance from the location of the shopping container but is not included in the order, and automatically dismissing the alarm based on the item being put back to a section where it was retrieved; and
      in response to a determination that the items in the order match the one or more items in the shopping container, associating, by the shopping management system, the order to the customer's user account to be paid by the customer.

2. The computer-implemented method of claim 1, wherein the registration information is generated by scanning a quick response (QR) code attached to the shopping container using the mobile device.

3. The computer-implemented method of claim 2, wherein associating the user account of the customer with the container ID is further based on an application associated with the user account used to scan the QR code or a QR code associated with the user account scanned from the mobile device of the customer.

4. The computer-implemented method of claim 1, wherein the RF tag is an RFID and the RF signal is an RFID signal.

5. The computer-implemented method of claim 1, wherein the checkout area is in proximity to an exit of the store.

6. The computer-implemented method of claim 1, further comprising sending an alarm when an RF signal is not detected from an item of the plurality of the items.

7. A non-transitory, computer-readable medium storing one or more instructions executable by a computer system to perform operations comprising:
   receiving, by a shopping management system, registration information including a container identifier (ID) associated with a shopping container from a mobile device of a customer shopping at a store;
   associating, by the shopping management system, a user account of the customer with the container ID based on the registration information;
   generating, by the shopping management system, an order associated with the container ID;
   detecting, by the shopping management system, a radio frequency (RF) signal from an RF tag attached to the shopping container using a plurality of radio frequency identification (RFID) readers installed in a shopping area of the store;
   determining, by the shopping management system, a location of the shopping container in the store by performing a location calculation based on the RF signal from the RF tag attached to the shopping container;
   detecting, by the shopping management system, a plurality of RF signals from a plurality of RF tags attached to a plurality of corresponding items in the store using the plurality of RFID readers installed in the shopping area of the store;
   determining, by the shopping management system, a plurality of locations of the plurality of corresponding items in the store by performing a location calculation based on the plurality of RF signals from the plurality of RF tags attached to the plurality of corresponding items;
   adding, by the shopping management system, an item of the plurality of corresponding items to the order when the location of the item is within a predetermined distance from the location of the shopping container;
   removing, by the shopping management system, a particular item in the order when the location of the particular item is outside the predetermined distance from the location of the shopping container;
   determining, by the shopping management system according to the location of the shopping container, that the customer arrives at a checkout area of the store; and
   checking out, by the shopping management system, the customer at the checkout area of the store, wherein checking out the customer includes:
      determining, by the shopping management system, one or more items in the shopping container at the checkout area of the store, wherein the one or more items are within the predetermined distance from the shopping container based on the RF signal detected from the RF tag attached to the shopping container and one or more RF signals detected from one or more RF tags attached to the one or more items;
      checking, by the shopping management system, items in the order with the one or more items in the shopping container;
         wherein the checking triggers an alarm for an item that is determined to be within the predetermined distance from the location of the shopping container but is not included in the order, and automatically dismissing the alarm based on the item being put back to a section where it was retrieved; and
      in response to a determination that the items in the order match the one or more items in the shopping container, associating, by the shopping management system, the order to the customer's user account to be paid by the customer.

8. The non-transitory, computer-readable medium of claim 7, wherein the registration information is generated by scanning a quick response (QR) code attached to the shopping container using the mobile device.

9. The non-transitory, computer-readable medium of claim 8, wherein associating the user account of the customer with the container ID is further based on an application associated with the user account used to scan the QR code or a QR code associated with the user account scanned from the mobile device of the customer.

10. The non-transitory, computer-readable medium of claim 7, wherein the RF tag is an RFID and the RF signal is an RFID signal.

11. The non-transitory, computer-readable medium of claim 7, wherein the checkout area is in proximity to an exit of the store.

12. The non-transitory, computer-readable medium of claim 7, further comprising sending an alarm when an RF signal is not detected from an item of the plurality of the items.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a shopping management system, registration information including a container identifier (ID) associated with a shopping container from a mobile device of a customer shopping at a store;
      associating, by the shopping management system, a user account of the customer with the container ID based on the registration information;
      generating, by the shopping management system, an order associated with the container ID;
      detecting, by the shopping management system, a radio frequency (RF) signal from an RF tag attached to the shopping container using a plurality of radio frequency identification (RFID) readers installed in a shopping area of the store;
      determining, by the shopping management system, a location of the shopping container in the store by performing a location calculation based on the RF signal from the RF tag attached to the shopping container;
      detecting, by the shopping management system, a plurality of RF signals from a plurality of RF tags attached to a plurality of corresponding items in the store using the plurality of RFID readers installed in the shopping area of the store;

determining, by the shopping management system, a plurality of locations of the plurality of corresponding items in the store by performing a location calculation based on the plurality of RF signals from the plurality of RF tags attached to the plurality of corresponding items;

adding, by the shopping management system, an item of the plurality of corresponding items to the order when the location of the item is within a predetermined distance from the location of the shopping container;

removing, by the shopping management system, a particular item in the order when the location of the particular item is outside the predetermined distance from the location of the shopping container;

determining, by the shopping management system according to the location of the shopping container, that the customer arrives at a checkout area of the store; and checking out, by the shopping management system, the customer at the checkout area of the store, wherein checking out the customer includes:

determining, by the shopping management system, one or more items in the shopping container at the checkout area of the store, wherein the one or more items are within the predetermined distance from the shopping container based on the RF signal detected from the RF tag attached to the shopping container and one or more RF signals detected from one or more RF tags attached to the one or more items;

checking, by the shopping management system, items in the order with the one or more items in the shopping container;

wherein the checking triggers an alarm for an item that is determined to be within the predetermined distance from the location of the shopping container but is not included in the order, and automatically dismissing the alarm based on the item being put back to a section where it was retrieved; and in response to a determination that the items in the order match the one or more items in the shopping container, associating, by the shopping management system, the order to the customer's user account to be paid by the customer.

14. The computer-implemented system of claim 13, wherein the registration information is generated by scanning a quick response (QR) code attached to the shopping container using the mobile device.

* * * * *